M. SPEAR.
MACHINE FOR SAWING TIMBER, &c.
No. 8,401. Patented Sept. 30, 1851.
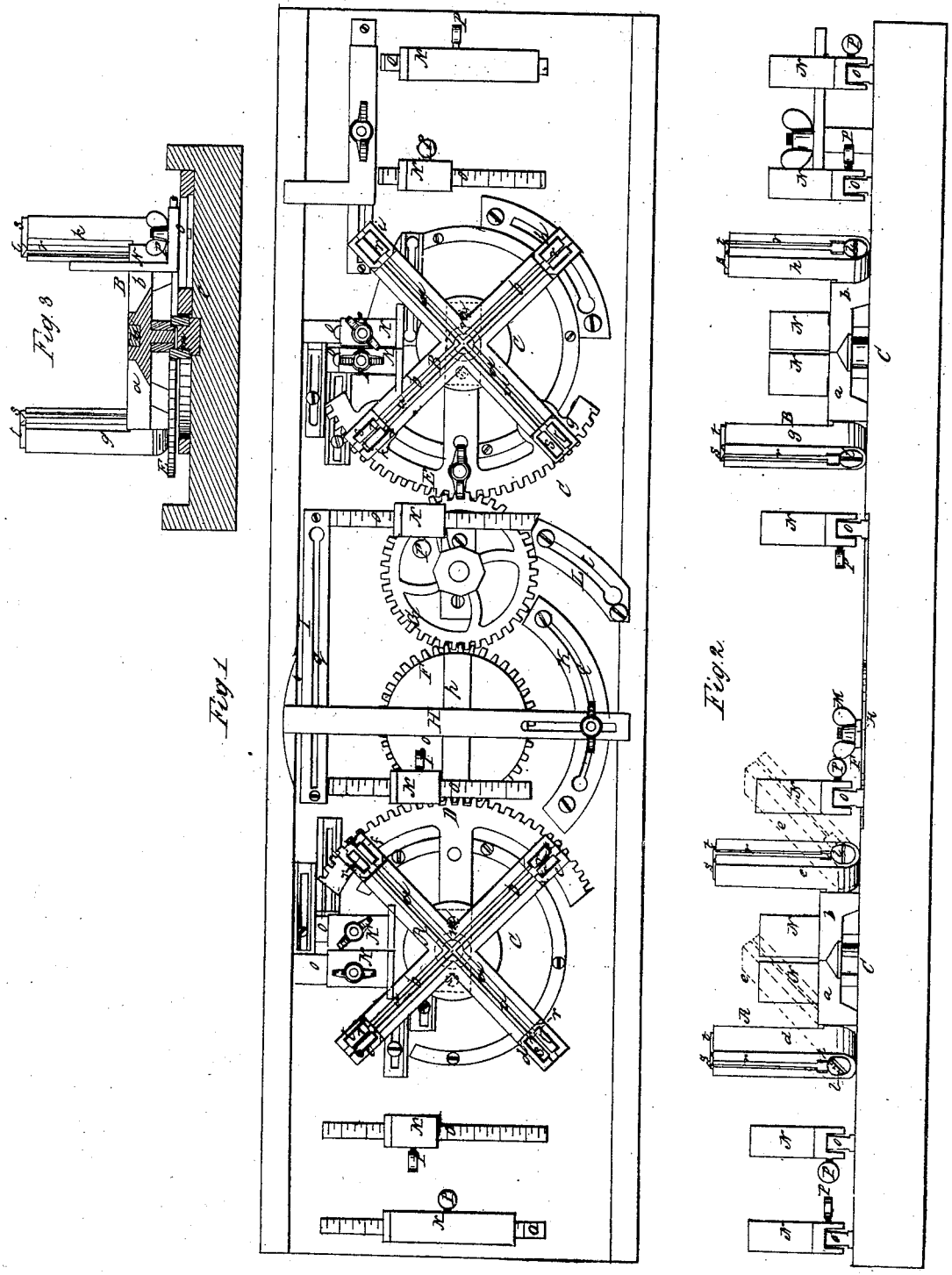

UNITED STATES PATENT OFFICE.

MATTHEW SPEAR, OF BOWDOINHAM, MAINE.

MITER-BOX.

Specification of Letters Patent No. 8,401, dated September 30, 1851.

*To all whom it may concern:*

Be it known that I, MATTHEW SPEAR, of Bowdoinham, in the county of Lincoln and State of Maine, have invented a new and useful machine to enable a person to saw the ends of timber, plank-boards, to such angle or angles or miter as may be desirable; and I do hereby declare that the same is fully described and represented in the following specification and accompanying drawings, letters, figures, and references thereof.

Of the said drawings Figure 1, denotes a top view of my said mitering machine. Fig. 2, is a front elevation of it. Fig. 3, is a vertical and transverse section taken through the center of one of the revoluble saw guides.

In the said drawings A, and B, denote two revoluble saw guides, each of which is composed of two bars $a$, $b$, arranged at right angles to each other, and support at their opposite ends four uprights $c$, $d$, $e$, $f$, or $g$, $h$, $i$, $k$, each of which uprights is so applied or connected to its bar, as to be capable of being turned or set to any angle with the horizontal plane, and this in a plane perpendicular to the bar, in a direction lengthwise of it, that is to say, each of the uprights turns upon a screw or pin $l$, extending through it and into the end of the bar. Each set of horizontal cross bars $a$, $b$, turns horizontally around upon a suitable center pin or pivot $m$, extended upwards from a bed plate $c$.

A curved segment or rack of teeth D or E, is affixed to each saw guide A, B, and made to stand in position as seen in Figure 1, and between these two racks, and made to engage therewith and with one another at the same time, are two toothed gears F, G, which are supported on the base or platform C, so as to be capable of a free horizontal rotation. Crossed grooves $o$, $p$, are made down into the upper surface of the gear F, and at right angles to one another, and each of a size to receive a metallic bar H, which is laid in either of the said grooves and operates in connection with one or more curved or straight and slotted bars I, K, L, arranged in any convenient manner around or near the said wheel F and elevated somewhat above the platform C.

A set screw and nut, seen at M, properly adapted to the bar H, and the slot $q$, of the bars I, K or L, serves to confine the said bar H, in any suitable position.

Any suitable number of sliding gages or rests N, N &c, fixed respectively on horizontal rails O, O, O &c., may be arranged as seen in the drawings, and be so adapted to such rails, as to be capable of being respectively moved and fixed in any desirable position thereon by set screws P P P &c, some of these gages are placed between the arms of the saw guides A, B, while others are disposed outside of them. They are for the purpose of holding the timber, plank or board in correct position with respect to the saw guides, during the operation of the saw. Each of the uprights $c$, $d$, $e$, $f$, $g$, $h$, $i$, $k$, has a slot or saw pathway made downwards in it, as seen at $r$, the saw paths of any two opposite uprights or those attached to the same bar $a$ or $b$, are cut in the same plane.

In the drawings I have represented each of the uprights as made to hold or contain two pieces of wood boards $s$, $t$, placed apart at the distance of the thickness of the saw. And I have also represented each of the bars $a$, $b$, as provided with a piece of wood $u$, let down into it, and extended from end to end of it, the same being to prevent injury to the teeth of the saw, when they press through the timber or board.

By making each of the uprights so as to receive and hold the two flat pieces or strips of board $s$, $t$, we are enabled to use such strips of different thicknesses or such as may be necessary for any saw which may be employed.

To use the machine, the stick of timber board or plank to be mitered, is laid upon and against some of the sliding gages or rests, and placed so that the ends or part to be sawed off, shall project in a proper manner beyond the plane of the slits of the two uprights, through which the saw is to pass. Now if these uprights are disposed vertically, the plane of the cut of the saw will be a vertical one, and the angle which such plane makes with the length of the timber, will depend on the horizontal position in which the two uprights may have been set or caused to assume.

While one of the rotary frames or saw guides A, B, is set with its uprights, through which the saw is to pass in the angle of the required miter of the end of the stick of timber, the other saw guide may have two of its uprights so arranged horizontally and with respect to the length of the timber, as to enable a person to cut another timber, or whatever the mitered end of the first is to abut against, to the complement of the angle which the two are to make with each other.

Now as it is often desirable particularly in ship timber to cut the plane of the miter to an acute angle in two directions with the general length of the stick, that is to say so that the plane of the miter may not only be at an acute angle with one side of the stick, but at the same time, at an acute angle with one of the sides, not parallel to such first named side, I make or apply the uprights c, d, e, f, &c., to the bars a, b, so as to be capable of being turned down into positions inclined to the horizon as denoted by dotted lines in Fig. 2. Where any two of such uprights of any one bar a or b, are so turned down to the same angle with the horizon, the saw when placed within them will be turned down to such angle.

My machine is particularly adapted and intended for the use of the ship carpenter, although it may be employed to great advantage by house carpenters, furniture makers, or many other workers in woods.

What I claim is—

One or two rotary saw guides A, B, with sliding gage rests N, N, &c., and mechanism for rotating the guides, and fixing them in any desirable position or positions as specified, in combination with the improvement of making or applying the uprights c, d, e, f, &c., or vertical supports of the saw to the bars a, b, so as to be capable of being turned down to an angle with the horizon, for the purpose as described.

In testimony whereof I have hereto set my signature this twenty-sixth day of March A. D. 1851.

MATTHEW SPEAR.

Witnesses:
R. H. EDDY,
F. GOULD.